United States Patent [19]

Vogel

[11] Patent Number: 5,028,999
[45] Date of Patent: Jul. 2, 1991

[54] SOURCE ENCODER FOR VIDEO PICTURES HAVING A QUANTIZER WHOSE STEPSIZE IS CONTROLLED IN AN INCREMENTAL MANNER

[75] Inventor: Peter Vogel, Diepersdorf, Fed. Rep. of Germany

[73] Assignee: U.S. Philips Corp., New York, N.Y.

[21] Appl. No.: 171,726

[22] Filed: Mar. 22, 1988

[30] Foreign Application Priority Data

Mar. 27, 1987 [DE] Fed. Rep. of Germany ....... 3710119

[51] Int. Cl.$^5$ .............................................. H04N 7/12
[52] U.S. Cl. .................................. 358/133; 358/138; 358/141
[58] Field of Search ............... 358/138, 133, 135, 136, 358/141

[56] References Cited

U.S. PATENT DOCUMENTS

| | | | |
|---|---|---|---|
| 4,517,596 | 4/1915 | Suzuki | 358/138 X |
| 4,580,162 | 4/1986 | Mori | 358/138 X |
| 4,706,260 | 11/1987 | Fedele et al. | 358/133 X |
| 4,725,885 | 2/1988 | Gonzales et al. | 358/135 |

Primary Examiner—James J. Groody
Assistant Examiner—Victor R. Kostak
Attorney, Agent, or Firm—Marianne R. Rich

[57] ABSTRACT

The source encoder for video pictures described includes a preprocessing unit (PP) which supplies block-sequentially the data of a video picture. The video picture is then transferred to an encoding unit (C) via a controllable switch (S). The encoding unit includes inter alia a picture store and a controllable quantizer; it is followed by a buffer store (PS). A control unit (K) supervises the buffer store (PS) and controls in dependence on the filling level thereof the controllable switch (S), the encoding unit (C) and the quantizer included therein. In order to obtain a good picture quality, measures have been taken to ensure that the control unit (K) additionally controls the quantizer in dependence on the time elapsed after the maximum filling level of the buffer store (PS) has been reached and/or in dependence on the actual value of the quantization stepsize, such that during the entire operation the value of the quantization stepsize only passes through adjacent values.

3 Claims, 1 Drawing Sheet

SOURCE ENCODER FOR VIDEO PICTURES HAVING A QUANTIZER WHOSE STEPSIZE IS CONTROLLED IN AN INCREMENTAL MANNER

BACKGROUND OF THE INVENTION

1. Field of the Invention

The invention relates to a source encoder for video pictures having an encoding unit, and including a control unit which supervises the filling level of a buffer store connected in cascade to an encoding unit and which in dependence upon that filling level, controls a quantizer included in the encoding unit.

2. Description of Related Art

A source encoder with these features is disclosed in an article by G. Lutz et al. (Lutz, G., Speidel, J. und Streicher, E.: Der Videokonferenz-Codec 2Mbit/s-Ein System zur Uebertragung von Bewegtbildern und Grafiken, Sprache und Daten mit 2Mbit/s. PKI Technische Mitteilungen (1985), Vol. 1, pages 50–60). FIG. 1 shows a basic circuit diagram of the prior art source encoder. In this FIG. D denotes a data source producing data from video pictures for an encoding unit C, in which a code conversion of the video data is effected in a bit-saving line code. The encoding unit C is preceded by a pre-processing unit PP. The pre-processing unit PP arranges the video data in blocks: i.e. the data of picture elements which are located in square picture sections. The encoding unit C includes inter alia a picture store in which every T seconds all the blocks associated with a video picture (video pictures must here be understood to mean fields or frames) are stored via a switch S and are intermediately stored until the moment at which they are processed. In addition it also includes a controllable quantizer by means of which the number of bits is controlled by coarse or fine quantization, by which the information components of the blocks are encoded with a more or less great loss of information. This encoded information is written at a bit rate which fluctuates in time in a buffer store PS and, read therefrom at a constant bit rate and transferred to a receiver.

The filling level F of the buffer store PS is continuously supervised by a control unit K. The encoding unit C, the quantizer and the switch S are controlled such, in dependence on the filling level F, that the buffer store PS can neither overflow nor be emptied completely. If, for example, the filling level F of the buffer store PS increases, then the control unit K provides that the quantization stepsize is continuously increased so that consequently the quantization gets coarser. If the filling level decreases the quantization is refined. If in spite of the coarsest quantization the filling level F increases to above the maximum value $F_{max}$, the switch S is opened for at least an integral multiple of T seconds, i.e. at least one video picture is omitted from the video picture sequence at the transmitter end (frame or field sub-sampling). This fact is transmitted to the receiver by means of a appropriate information, the video picture received last being repeated on the display screen of this receiver, instead of the missing video picture.

On reaching the filling level $F_{max}$ the overall encoding circuit C is inoperative for T seconds; then the filling level F of the buffer store PS decreases as it is emptied at a constant bit rate until a lower level $F_o$. Then the encoding unit C resumes operation, and more specifically—as the filling level increases again—with ever increasing quantization stepsizes, so increasingly coarser quantization, until the filling level $F_{max}$ is reached again or all the blocks stored in the picture store of the encoding unit C have been processed. When the filling level $F_{max}$ has been reached again, the encoding unit is stopped again for T seconds. When the stored blocks have been processed, the switch S is closed as soon as the subsequent integral multiple of T seconds after its opening has ended.

The quality of the video picture displayed on the display screen at the receiver end in the prior art encoder needs improvement on the following grounds: During the encoding of a video picture stored in the picture store of the encoding unit C, all the values for the quantization interval are in certain circumstances even cycled-through many times. Consequently, fluctuations between the highest and the poorest quality of individual picture areas occur within a video picture. At the receiver end these circumstances result in that the displayed picture gives an unacceptable total impression for the observer for a short time.

SUMMARY OF THE INVENTION

Consequently, the invention has for its object to provide an encoder of the type defined in the opening paragraph with which an improved picture quality can be obtained at the receiver end compared with the known encoder.

This object is accomplished in that the control unit controls the quantizer in dependence upon the period of time after the maximum filling level of the buffer store has been reached and/or in dependence on the actual value of the quantization stepsize, in such a manner that during the entire operation the value of the quantization stepsize only passes through adjacent values.

Advantageous embodiments of the invention are described hereinafter.

The invention and how it can be put into effect will now be described with reference to the accompanying Figures.

DETAILED DESCRIPTION OF THE PREFERRED EMBODIMENTS

Figure 1:
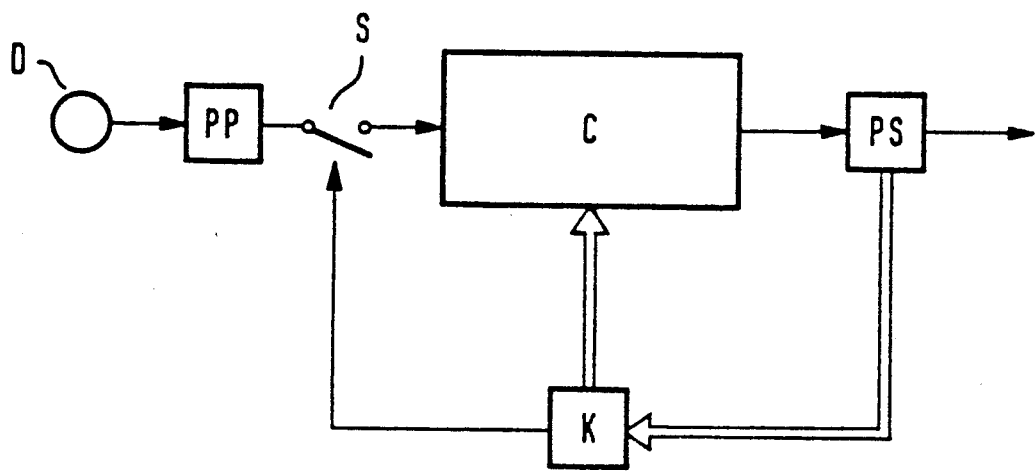
FIG. 1 shows a basic circuit diagram of a source encoder according to the prior art mentioned in the preamble and FIG. 2 shows a time diagram for the filling level of a buffer store and the value of the quantization stepsize of a quantizer.

FIG. 1 has extensively been described in the introductory part of this specification. For the sake of completeness it is mentioned here that FIG. 1 does not indicate the clock supply, not even a suggestion thereof, as it is not an object of the invention. For a detailed structure of the source encoder a person skilled in the art is referred to, for example, the prior art mentioned in the preamble and the literature cited there.

Figure 2:
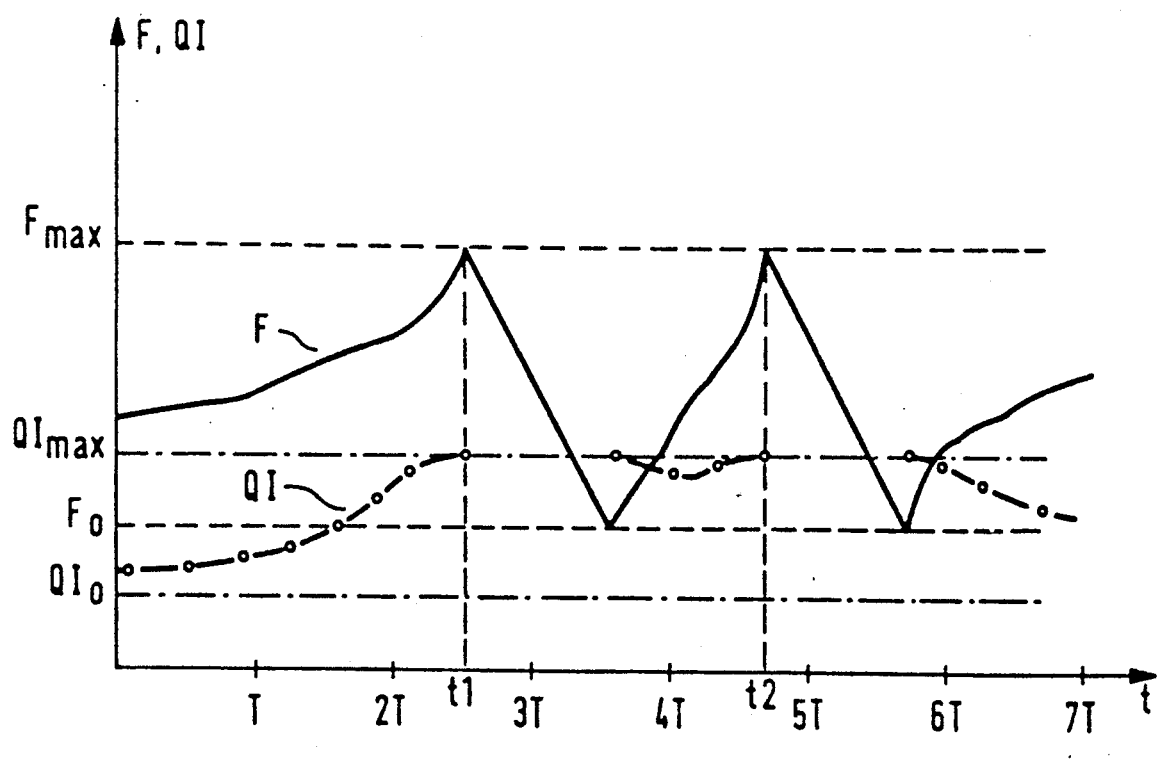

FIG. 2 shows a possible variation of the filling level F of a buffer store and also the value QI of the quantization stepsize of a quantizer used in the encoding unit C of FIG. 1. Time instants are plotted on the time axis of FIG. 2 with intervals of T seconds. At each of these instants the preprocessing unit PP of FIG. 1—the switch S is consequently closed in normal operation—conveys in normal operation the data of a frame to the picture store of the encoding unit C. Consequently, 1/T is the picture sequence frequency shown in Hertz; in the present example this frequency has a value of 10 Hz for pictures having 288 lines and 360 picture elements per line.

As can also be seen from FIG. 2, the filling level F (solid-line curve) of the buffer store PS twice reaches its maximum value $F_{max}$, more specifically at the instants t1 and t2. At these instants the total activity of the encoder C of FIG. 1 is stopped for T seconds (100 ms) (processing stop); more specifically, no data are then entered into the buffer store PS of FIG. 1, so that this store is emptied in the present example at a bit rate of 64 kBit/s. Consequently after 100 ms the content of the buffer store PS has been reduced by 6400 bits; then the encoder C is made operative again and the filling level F increases again from the value $F_o$ to the value $F_{max}$. The encoder C is now stopped again and the buffer store is only emptied during 100 ms. If finally the picture stored in the picture store located in the encoder C has been processed in this manner, then the switch S, which was opened at the instant t1, is closed again and a new picture is transferred to the picture store. The pictures which were provided by the preprocessing unit PP at the instants 3T, 4T, 5T and 6T, are not transferred to picture store due to the fact that the switch S is open.

Also in the case the switch S is in the open state, the value QI of the quantization stepsize of the quantizer is changed during the processing of the picture stored in the picture store of the encoder by the control unit, provided the filling level of the buffer stores changes. At a high filling level the quantization becomes coarser, consequently the quantization stepsize get higher. At a maximum filling level $F_{max}$ the value QI is highest, namely QI max. Whilst in the prior art the value QI only depends upon the filling level of the buffer store PS, that is to say that after a processing stop of the encoder C the quantizer operates with much finer quantization. In accordance with the invention the value QI is now dependent upon other parameters to such an extent that the value of the quantization stepsize QI is not subjected to sudden and great changes. It is namely these changes during the encoding operation of a picture which result in an unacceptable picture quality.

In the present example the value QI only depends on the filling level F of the buffer store and on the period of time elapsed after the maximum filling level of the buffer store.

To simplify the explanation, an auxilary variable v is determined by the following equation:

$$v = \begin{cases} \frac{[t - (t_n + T)]}{c} & \text{for } c \geq t - (t_n + T) \geq 0 \\ 1 & \text{for } t - (t_n + T) > c \\ \text{non—defined otherwise,} \end{cases}$$

wherein $t_n$ is the instant at which the filling level F has reached the value $F_{max}$ for the last time after t seconds have elapsed and c symbolizes a predeterminable, positive time constant. Typical values of c are T/10 seconds, i.e. 10 ms in the present example.

If now the value of the quantization stepsize is controlled such in dependence on the auxiliary variable and the filling level F, that $$QI(v,F) = (1-v)g(F_{max}) + v\, g(F), \quad (1)$$

wherein g(F) is a "steadily" and monotonously increasing function of F, then the value QI of the quantization stepsize cannot "jump"; it is a "steady" function of the two variables v and t, respectively, and F. The quotation marks are necessary since all the quantities are indigital representation with a finite number of bits and consequently the notions "steady" and "jump" cannot be used in their original meaning. A possible variation of QI(v,F) is plotted in FIG. 2 (dot-and-dash line), therein $QI_{max} = g(F_{max})$ and $QI_o = g(F_o)$. The variation shows the "steadiness" of QI.

It should be noted that during the operation stop of the encoder C, the value QI need not to be defined, as it is not needed. It is only of importance that during the operation of the encoder C the value QI does not "jump", but only passes through adjacent values, independent of the fact whether the operation is interrupted by a pause or not.

What is claimed is:

1. A source encoder for video pictures used in conjunction with a buffer store, said source encoder having an encoding unit including a controllable quantizer which quantizes video data at a plurality of different incremental stepsizes, and a control unit coupled to said buffer store for monitoring the filling level of the buffer store and for controlling the stepsize at which said controllable quantizer quantizes said video data, wherein at any given time the control unit controls the stepsize of the quantizer in dependence upon the period of time after the maximum filling level of said buffer store was previously reached, in dependence of the filling level of the buffer store at the given time, and in dependence upon the value of the quantization stepsize at the given time, such that during operation of said source encoder, the value of the quantization stepsize utilized by said controllable quantizer changes only at one increment at a time.

2. A source encoder as claimed in claim 1, wherein the control unit (K) controls the quantizer such that the value QI of the quantization stepsize changes in accordance with the formula $$QI = (1-v)g(F_{max}) + v\, g(F)$$

wherein g(F) denotes a monotonously increasing function of the filling level F of the buffer store (PS), $F_{max}$ denotes the maximum filling level of the buffer store (PS) and v denotes an auxiliary variable, and the auxiliary variable is zero when, after having reached the maximum filling level $F_{max}$, the encoding unit resumes its operation, and then increases to the value one as a function of time.

3. A source encoder as claimed in claim 2, wherein the auxiliary variable increases linearly with time to the value one and its rate of change is approximately ten times higher than the frame frequency of the video picture.

* * * * *